(12) United States Patent
Rost

(10) Patent No.: US 9,285,609 B1
(45) Date of Patent: Mar. 15, 2016

(54) ERGONOMIC POWER SWITCH FOR A WEARABLE ELECTRONIC DEVICE

(71) Applicant: Amazon Technologies, Inc., Reno, NV (US)

(72) Inventor: Robert Duane Rost, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 162 days.

(21) Appl. No.: 14/223,477

(22) Filed: Mar. 24, 2014

(51) Int. Cl.
*G01C 1/00* (2006.01)
*G02C 11/00* (2006.01)

(52) U.S. Cl.
CPC ...................................... *G02C 11/10* (2013.01)

(58) Field of Classification Search
CPC .............................................. G02B 2027/0178

USPC .................... 351/158, 136, 137, 138, 139, 41
See application file for complete search history.

(56) References Cited

U.S. PATENT DOCUMENTS

2015/0230988 A1* 8/2015 Chao ....................... A61F 9/045
351/159.78

* cited by examiner

*Primary Examiner* — Hung Dang
(74) *Attorney, Agent, or Firm* — Lee & Hayes, PLLC

(57) ABSTRACT

Disclosed are ergonomic power switches for wearable electronic devices. A wearable electronic device may include a circuit including a power supply, and an ergonomic power switch to selectively close the circuit. The ergonomic power switch may comprise multiple elements that are configured to cause closure of the circuit in response to a connection event. The connection event may occur in response to a portion of a user's body being positioned between the multiple elements.

21 Claims, 7 Drawing Sheets

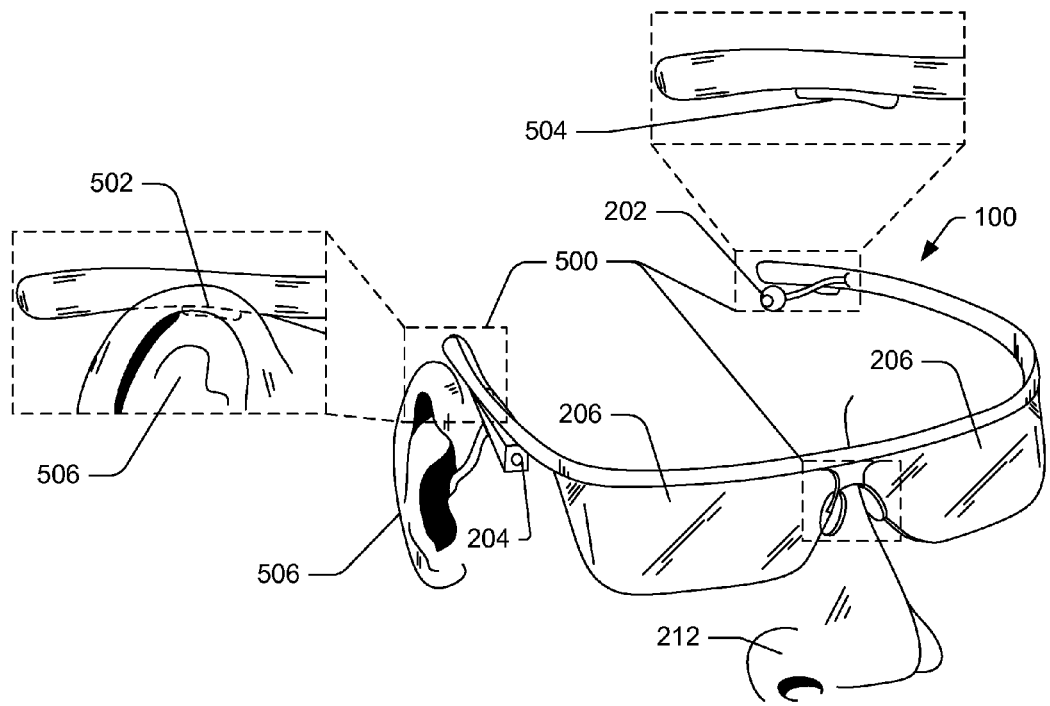
Fig. 5
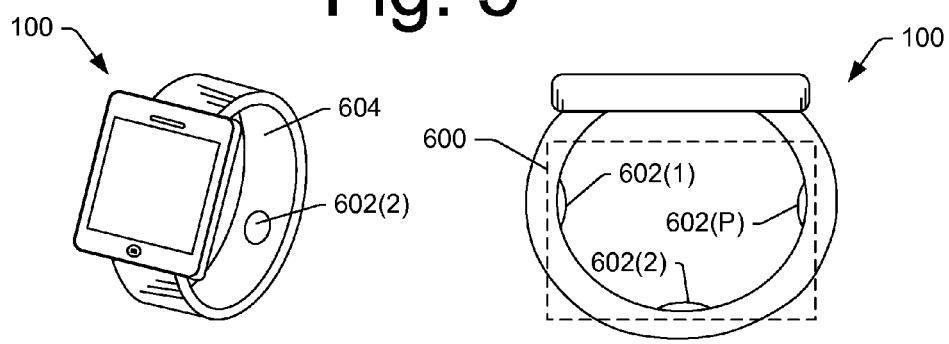
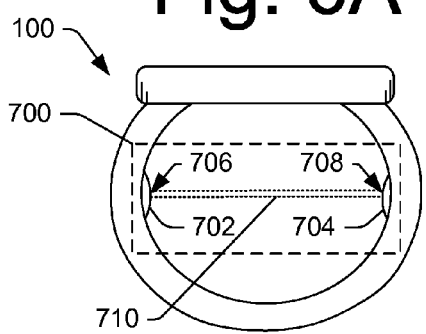
Fig. 6A
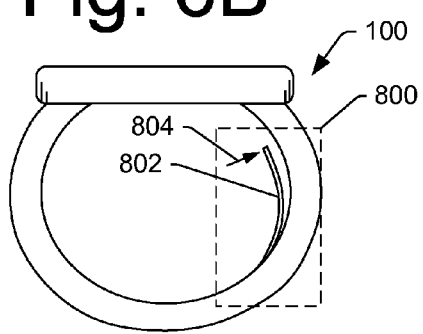
Fig. 6B
Fig. 7
Fig. 8

ERGONOMIC POWER SWITCH FOR A WEARABLE ELECTRONIC DEVICE

BACKGROUND

Wearable electronic devices are gaining popularity among consumers. Devices such as smart glasses, smart watches, fitness wristbands, and the like, provide a variety of utilities to a user. Wearable electronic devices, even in their simplest form (e.g., a flashlight or hearing aid on a wearable device), combine consumer utilities with the convenience of wearing everyday garments or accessories.

However, current wearable electronic device are not designed to fully leverage our understanding of human factors and human-device interaction. As a consequence, current wearable electronic devices are limited in terms of the level of comfort, safety, usability, and productivity they can offer to consumers who desire seamless, intuitive interaction between themselves and their wearable electronic devices.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 5 shows a perspective view of an example ergonomic power switch, and close-up side elevation views of portions of the ergonomic power switch according to another embodiment.

FIGS. 6A and 6B show a perspective view and a side elevation view, respectively, of an example wearable electronic device including an example ergonomic power switch according to another embodiment.

FIG. 7 shows a side elevation view of the example wearable electronic device of FIG. 6A including an example ergonomic power switch according to another embodiment.

FIG. 8 shows a side elevation view of the example wearable electronic device of FIG. 6A including an example ergonomic power switch according to another embodiment.

DETAILED DESCRIPTION

Disclosed herein are ergonomic power switches for wearable electronic devices. In some embodiments, a wearable electronic device includes a circuit including a power supply and an ergonomic power switch that is configured to selectively close the circuit for switching the wearable electronic device from a power off state wherein an electrical component does not receive power from the power supply to a power on state where power is supplied to the electrical component from the power supply. Closure of the circuit may be triggered by a connection event between multiple elements of the ergonomic power switch. The connection event may occur in response to a portion of a body of a user being positioned between the multiple elements. The user's body may cause the connection event to occur in a number of ways. For example, the user's body may act as an electrical conductor between multiple skin-conductive contacts included in the multiple elements. As another example, the user's body may intercept an optical beam transmitted between the multiple elements.

In some embodiments, an ergonomic power switch may be configured to contact a portion of a body of a user while the user wears the wearable electronic device. The ergonomic power switch may comprise a movable device that is biased toward a first position and movable to a second position in response to a force exerted upon the movable device by the portion of the body of the user when the wearable electronic device is worn by the user. The movable device may cause closure of the circuit when the movable device is in the second position.

The ergonomic power switch disclosed herein may improve the usability of the wearable electronic device by leveraging an understanding of human factors and human-device interaction to facilitate powering the wearable electronic device on and off in a more intuitive, user-friendly manner. In other words, the ergonomic power switch disclosed herein is configured to switch the wearable electronic device into a power on state upon the user wearing the wearable electronic device. In this manner, the wearable electronic device may be powered at times that the user is wearing the device, and turned off, or at least components of the device turned off, when the user is not wearing the device. For example, the wearable electronic device, or components of the device, may be powered off when the user may otherwise forget to manually power down the device, such as when the user removes the wearable electronic device in a hurry. Moreover, the inconvenience of pressing a power button with one's finger may be avoided, and the wearable electronic device may be used in a more convenient, productive manner.

The techniques, systems, and devices described herein may be implemented in a number of ways. Example implementations are provided below with reference to the following figures.

Illustrative Wearable Electronic Devices

Figure 1:
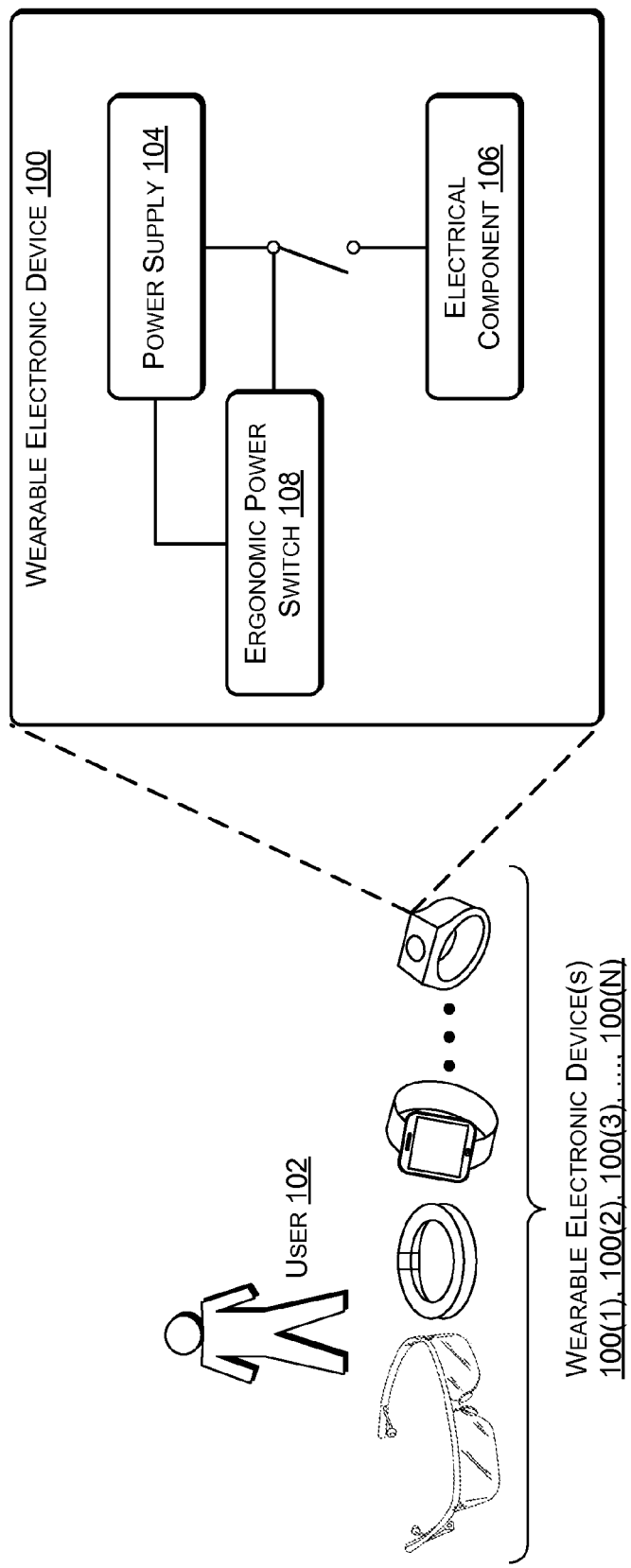
FIG. 1 illustrates example wearable electronic devices that include an ergonomic power switch.

FIG. 1 illustrates example wearable electronic devices 100(1), 100(2), 100(3), . . . , 100(N) that may be worn by a user 102. In this manner, the user 102 (sometimes referred to herein as a "consumer" or an "individual") may be associated with one or more of the wearable electronic devices 100(1)-(N) by virtue of owning, possessing, holding, and/or wearing a wearable electronic device(s) 100(1)-(N).

The wearable electronic devices 100(1)-(N) shown in FIG. 1 include a pair of electronic glasses 100(1) (e.g., smart glasses), electronic wristbands 100(2) and 100(3) (e.g., a fitness wristband such as the Nike® FuelBand or Fitbit® wristband, a smart watch, etc.), and an electronic ring 100 (e.g., a data ring). The wearable electronic devices 100(1)-(N) are shown merely for illustrative purposes, and it is to be appreciated that other types of wearable electronic devices 100(1)-(N) are contemplated herein. For example, other suitable wearable electronic devices 100(1)-(N) include, without limitation, audio-recording wristbands, electronic anklets, electronic shoes, electronic gloves and other clothing, hearing aids or ear buds, electronic earrings and necklaces, head mounted displays, headphones, or any other suitable garment or accessory that can be worn on the body of the user 102, such as the head or an appendage of the user 102. It is to be appreciated that the term "electronic wearable band," as used herein, may encompass a category of various wearable electronic devices 100(1)-(N) that are configured to be worn on an appendage (e.g., wrist, ankle, finger, etc.) of the user 102. For example, a smart watch, a fitness tracking wristband, an electronic anklet, and an electronic ring may all be considered to fit the category of an electronic wearable band.

The electronic capabilities of the wearable electronic devices 100(1)-(N) may range from a simple flash light (e.g., a light emitting diode (LED) flashlight), radio, and/or hearing aid, to a device with much more sophisticated computing capabilities such as smart glasses or a smart watch that are capable of storing applications and/or instructions in memory and executing the applications and/or instructions on one or more processors, as well as transmitting and receiving data over a network (e.g., the Internet).

FIG. 1 further illustrates that a wearable electronic device 100 may include a power supply 104 configured to supply power to the wearable electronic device 100. The power supply may comprise one or more batteries (e.g., a battery pack) that enable the wearable electronic device 100 to be powered autonomously and used in a mobile fashion. In some embodiments, the power supply 104 may further comprise auxiliary power supplies configured to supply power to the wearable electronic device 100 by any suitable means, such as wireless power transmission from a remote power source, and/or wired power transmission via a power chord or cable configured to physically connect to a power outlet or socket enabling the wearable electronic device 100 to be powered by an external power supply (e.g., an alternating current (AC) power supply of a building).

The wearable electronic device 100 may further include an electrical component 106 that may be electrically coupled to the power supply 104 to receive power from the power supply 104. The electrical component 106 of the wearable electronic device 100 may comprise any suitable component depending on the type and sophistication of wearable electronic device 100. For example, a relatively sophisticated wearable electronic device 100 in the form of smart glasses or smart watches (i.e., wearable computers) may include sensors (e.g., accelerometers, global positioning system (GPS) receivers, etc.), processing circuitry (e.g., one or more processors), and/ or an application-specific integrated circuit (ASIC) configured to perform application specific tasks, such as image processing, digital voice recording or audio processing, an operating system configured to manage hardware and services of the wearable electronic device 100, etc. It is also contemplated that the wearable electronic device 100 may include one or more input/output devices (e.g., buttons, a camera, speakers, microphones, etc.).

As another example, a wearable electronic device 100 may comprise a relatively unsophisticated electronic device such as a radio or a light. In such as scenario, the electrical component 106 may comprise a transceiver or an LED. Regardless of the type of electrical component 106 included within the wearable electronic device 100, the electrical component 106 may provide functionality for the wearable electronic device 100 and may be electrically coupled to the power supply 104 via circuitry including wiring, pins, connectors, and the like that are suitable for supplying power to the electrical component 106 from the power supply 104.

The wearable electronic device 100 may further include an ergonomic power switch 108 that is configured to selectively close the circuit including the power supply 104 and the electrical component 106 in order to switch the electrical component 106, and perhaps the wearable electronic device 100, from a "power off" state wherein the electrical component 106 does not receive power from the power supply 104 to a "power on" state with power being supplied to the electrical component 106 from the power supply 104, and vice versa. In this manner, the circuit (sometimes referred to herein as the power supply 104 circuit) includes the power supply 104 and is closable by the ergonomic power switch 108 to power at least a component of the wearable electronic device 100. It is to be appreciated that the technique of switching power to the electrical component 106 between on and off power states by the ergonomic power switch 108 may be performed by a hard power switch (i.e., a power wire being connected/disconnected) or a soft power switch (i.e., software controlled power switch) configured to switch the electrical component 106 to a low power, or power off state, in a safe manner through programmable instructions and/or circuitry.

As will be described in the following figures, the ergonomic power switch 108 is "ergonomic" in the sense that the ergonomic power switch 108 is configured to selectively close the circuit including the power supply 104 upon the user 102 wearing the wearable electronic device 100. Thus, usability, among other things, of the wearable electronic device 100 may be improved by the ergonomic power switch 108.

Figure 2:
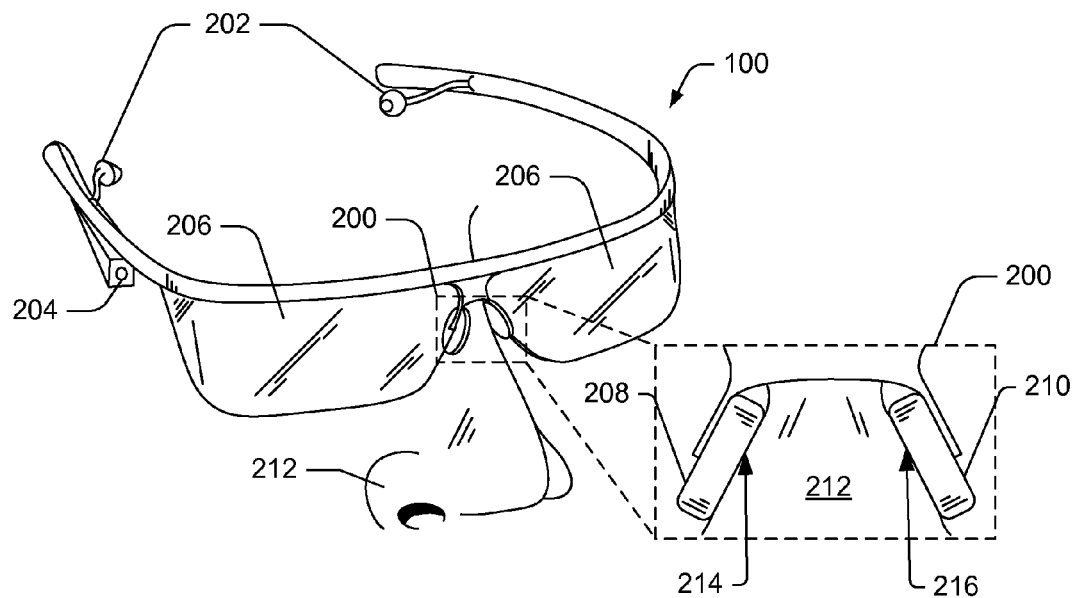
FIG. 2 shows a perspective view, and a close-up front elevation view, of an example ergonomic power switch of an example wearable electronic device.

FIG. 2 shows a perspective view, and a close-up front elevation view, of an example ergonomic power switch 200 of an example wearable electronic device 100 in the form of electronic glasses that may be worn by a user 102. In the example shown in FIG. 2, the wearable electronic device 100 may include one or more hardware components that act as a load on the power supply 104 when the wearable electronic device 100 is powered on and operating. The hardware components shown in FIG. 2 include a pair of ear buds 202 and a camera 204 that are example hardware components, shown merely for illustrative purposes. That is, the wearable electronic device 100 may include a single hardware component configured to provide a relatively simple utility (e.g., light, radio, etc.). The electronic glasses may include a lens 206 (e.g., a pair of lenses) that may be a prescription lens, a lens for ultraviolet radiation protection, and/or a sophisticated display device configured to output text, image and/or video content to the user.

FIG. 2 further illustrates, in the close-up front elevation view, that the ergonomic power switch 200 may comprise multiple elements 208 and 210. In the example of FIG. 2, the multiple elements 208 and 210 may be part of a nose piece of the electronic glasses. The nose piece may comprise a single nose piece configured to curve around a user's nose or the nose piece may comprise a pair of nose pads, as shown in FIG. 2. When the wearable electronic device 100 is worn by the user 102, a portion of a body 212 (e.g., the user's nose) of the user 102 may be positioned between the multiple elements 208 and 210 of the nose piece (i.e., within the nose piece). FIG. 2 illustrates that the multiple elements 208 and 210 of the ergonomic power switch 200 may contact the portion of the body 212 of the user 102, at least at periodic instances of time, while the wearable electronic device 100 is worn by the user 102. In other words, there may be moments where either or both of the multiple elements 208 and 210 lose contact with the portion of the body 212 of the user 102, but the multiple elements 208 and 210 are configured to remain predominantly in contact with the portion of the body 212 over a period of time during which the wearable electronic device 100 is worn by the user 102.

In some embodiments, the multiple elements 208 and 210 may be configured to detect a connection event between the multiple elements 208 and 210. The connection event may include a connection being established between the multiple elements 208 and 210 or a connection being lost (i.e., a disconnection) between the multiple elements 208 and 210. The connection that may be established between the multiple elements 208 and 210 may be in the form of an electrical connection, an optical connection, or any other suitable form of connection (e.g., an audible connection).

In the embodiment of FIG. 2, a connection event may occur in the form of an electrical connection being established between the multiple elements 208 and 210 using the portion of the body 212 (e.g., the user's nose) contacting the multiple elements 208 and 210 as an electrical conductor. In this scenario, the element 208 may include a skin-conductive material on an inside surface 214 of the element 208 to form a skin-conductive contact or electrode. Likewise, the same or similar skin-conductive material may be included on an inside surface 216 of the element 210 that contacts the portion of the body 212 upon the user 102 wearing the wearable electronic device 100. The multiple elements 208 and 210 may be connected individually to ground and, the portion of the body 212 of the user 102 may thereby close an electrical circuit between the multiple elements 208 and 210 to allow current to flow between the multiple elements 208 and 210. This establishes a connection event to trigger closure of the circuit with the power supply 104 by the ergonomic power switch 108.

In some embodiments, the inside surfaces 214 and 216 of the multiple elements 208 and 210 may be made from a skin-conductive material that includes, at least in part and without limitation, metals such as silver, gold, copper, or conductive non-metals such as electrically conductive forms of carbon including graphite, carbon black, powdered charcoal, and the like. Sweat on the surface of the skin may be suitable for lowering the resistive characteristics of the skin to enable a minimal amount of current needed to establish a connection event through the portion of the body 212 of the user 102. However, the skin-conductive material may further include additional elements to improve conductivity, and/or to overcome highly resistive dry skin qualities of particular individuals. For example, the skin-conductive material may include a solid electrolyte solution (e.g., including chloride ions) or gel that improves the conductive pathway between the user's skin and the multiple elements 208 and 210, and reduces skin impedance. In some embodiments, humectants (e.g., glycerol) may be included in the skin-conductive material to retain moisture in the skin-conductive material.

In some embodiments, a connection event that causes closure of the circuit including the power supply 104 may be determined from other suitable sensing mechanisms, such as a capacitive sensor or contact included on one or more of the elements 208 or 210. Other types of sensors are contemplated as suitable for detecting contact or proximity between the portion of the body 212 of the user 102 and one or more of the elements 208 or 210, suitable sensors including, but not limited to, resistive sensors, surface acoustic wave (SAW) sensors, or any suitable touch or proximity-based sensing mechanism. In this scenario, closure of the power supply 104 circuit may be triggered upon detection of the portion of the body 212 being positioned between the multiple elements 208 and 210 by identifying contact or proximity to at least one of the elements 208 or 210. In some embodiments, an electrical field of the user's body may be detected by one or more of the multiple elements 208 and 210 to cause closure of the power supply 104 circuit.

Figure 3:
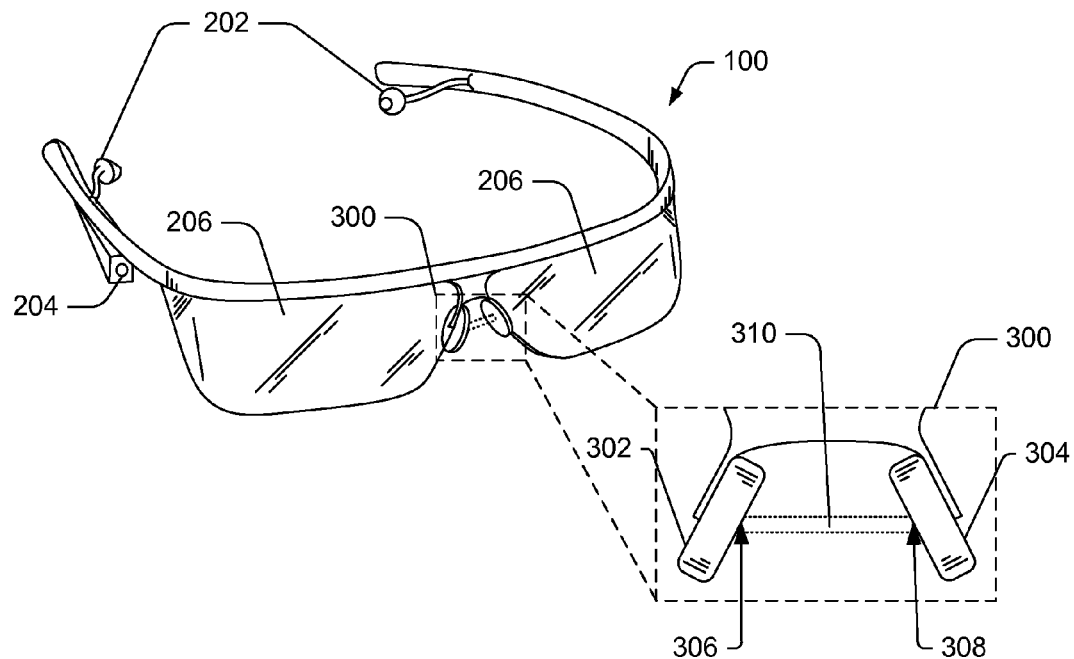
FIG. 3 shows a perspective view, and a close-up front elevation view, of an example ergonomic power switch of the wearable electronic device of FIG. 2 according to another embodiment.

FIG. 3 shows a perspective view, and a close-up front elevation view, of an example ergonomic power switch 300 of the wearable electronic device 100 of FIG. 2 according to another embodiment. In FIG. 3, the ergonomic power switch 300 may include multiple elements 302 and 304, which may be the same or similar to the multiple elements 208 and 210 (e.g., included on a nose piece of electronic glasses). The multiple elements 302 and 304 may include a transmitter 306 and a receiver 308 of an optical beam 310, such as an infrared beam. An optical beam 310 in the form of an infrared beam is invisible to the naked eye, and as such, the ergonomic power switch 300 including an infrared beam may be inconspicuous, which may be a consumer preference. In some embodiments, one of the elements 302 or 304 may include the transmitter 306 and the receiver 308, and the optical beam 310 may be reflected by a reflector included in the other element back to the receiver 308 at substantially the same location of the transmitter 306. In this scenario, the multiple elements 302 and 304 may still include the transmitter 306 and the receiver 308, but the transmitter 306 and the receiver 308 may be included on one of the elements, such as the element 304, with a reflector included on the other element 302. In any case, the connection event that causes closure of the power supply 104 circuit may occur upon the portion of the body 212 of the user 102 being positioned between the multiple elements 302 and 304 such that the optical beam 310 is broken from the standpoint of the receiver 308. In other words, when the user 102 wears the wearable electronic device 100, the user's nose may break or otherwise obstruct the optical beam 310 such that the receiver 308 does not receive or otherwise sense the optical beam 310. This type of connection event would be a "disconnection" event because the optical connection between the multiple elements 302 and 304 is disconnected upon the user 102 wearing the wearable electronic device 100.

Figure 4A:
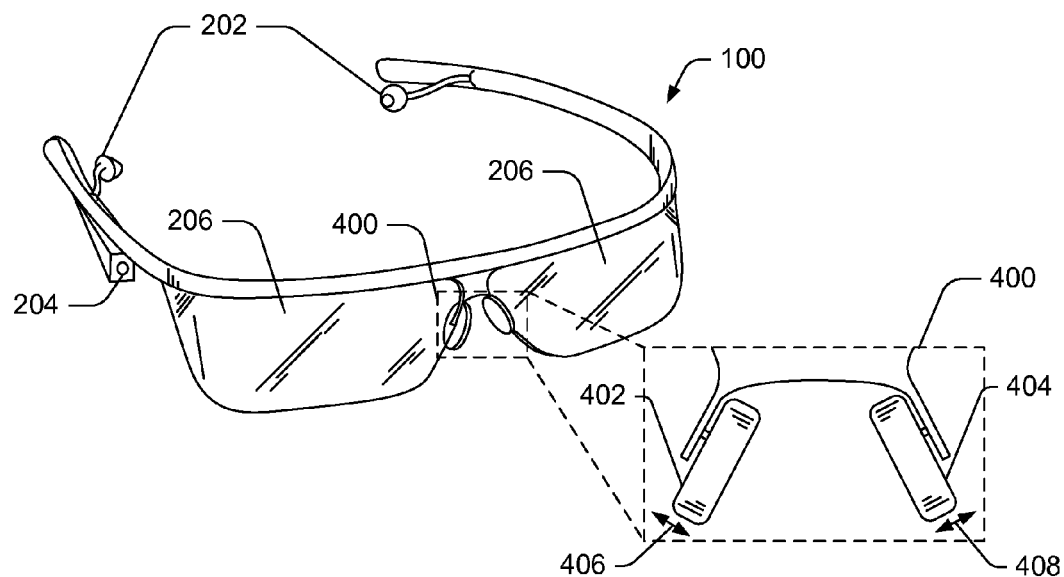
FIGS. 4A and 4B show perspective views, and close-up front elevation views, of an example ergonomic power switch of the wearable electronic device of FIG. 2 according to another embodiment.
Figure 4B:
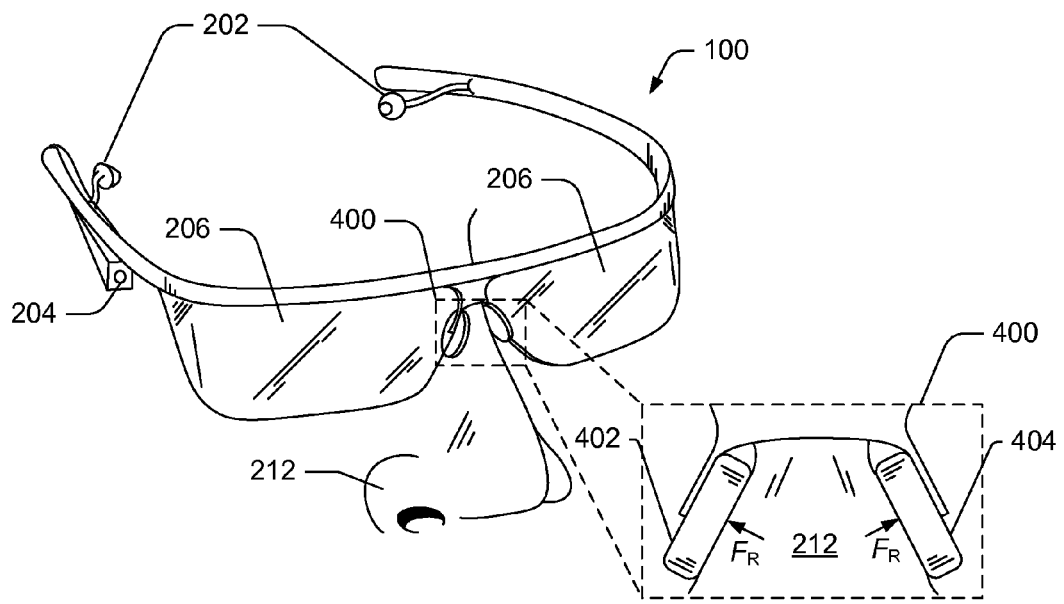

FIGS. 4A and 4B show perspective views, and close-up front elevation views, of an example ergonomic power switch 400 of the wearable electronic device 100 of FIG. 2 according to yet another embodiment. In the embodiment of FIGS. 4A and 4B, the ergonomic power switch 400 may be a mechanical-based ergonomic power switch 400 in that the ergonomic power switch 400 relies on mechanical movement and/or mechanical forces exerted upon the ergonomic power switch 400 from the portion of the body 212 of the user 102 when the user 102 wears the wearable electronic device 100, as shown in FIG. 4B. In some embodiments, the multiple elements 402 and 404 of the ergonomic power switch 400 are configured to move between a first and second position, as shown by the arrows 406 and 408. In a first position, shown in FIG. 4A, the multiple elements 402 and 404 (i.e., nose pads), under the force of gravity, may be biased, or drawn, away from a frame of the electronic glasses when the user 102 is not wearing the electronic glasses. The multiple elements 402 and 404 may be biased in other ways, as well, such as opposing magnets, a spring(s), or any suitable biasing mechanism. In some embodiments, only one of the multiple elements 402 or 404 may be movable.

Upon wearing the wearable electronic device 100, the portion of the body 212 may exert a reaction force, $F_R$, on the multiple elements 402 and 404, which may cause closure of the power supply 104 circuit by the ergonomic power switch 400. The ergonomic power switch 400 may include a mechanical switch element, such as a leaf switch, or any other suitable type of mechanical switch mechanism to detect that one or more of the multiple elements 402 and 404 have been moved to the second position that is closer, and perhaps in contact with, the frame of the electronic glasses. In some embodiments, the multiple elements 402 and 404 may not move (i.e., remain substantially stationary), but are still configured to detect the reaction force, $F_R$, on one or more of the multiple elements 402 and 404. In this scenario, a pressure sensitive mechanism or material may be used, such as a force sense resistor or the like, so that pressure at the surface of one or more of the elements 402 or 404 may be detected upon the reaction force, $F_R$, exerted upon the surface of either or both elements 402 or 404.

FIG. 5 shows a perspective view of an example ergonomic power switch 500, and close-up side elevation views of portions of the ergonomic power switch 500, according to another embodiment. Specifically, the ergonomic power switch 500 may include elements 502 and 504 (e.g., temple pads) that are configured to register a connection event upon another portion of the body 506 (e.g., the user's ears) of the user 102 being positioned between the elements 502 and 504. In some embodiments, closure of the power supply 104 circuit may be triggered by either or both of a first connection event at the nose piece described with reference to FIGS. 2, 3, 4A, and 4B, and a second connection event at the elements 502 and 504. As such, the wearable electronic device 100 may be better suited to sustain a connection event in situations where the user 102 intermittently lifts the nose piece, for example. The wearable electronic device 100 may further be configured in a "dual switch mode" to trigger closure of the power supply 104 circuit by the ergonomic power switch 500 with greater confidence that the user 102 is wearing the wearable electronic device 100. For example, the user 102 may grasp his/her electronic glasses by the nose piece and inadvertently place his/her finger between the nose pads. However, if the dual switch mode shown in FIG. 5 is enabled, closure of the power supply 104 circuit may not be triggered unless a second connection event occurs by positioning a portion of the user's body, such as the portion of the body 506 (e.g., the user's ears), between the elements 502 and 504. Accordingly, the confidence that the wearable electronic device 100 is being worn by the user 102 is increased in such a scenario whereby accidental or inadvertent connection events may be ignored.

FIGS. 6A and 6B show a perspective view and a side elevation view, respectively, of an example wearable electronic device 100 in the form of an electronic watch (a type of electronic wearable band) including an example ergonomic power switch 600 according to another embodiment. The ergonomic power switch 600 may include multiple elements 602(1), 602(2), . . . , 602(P). The ergonomic power switch 600 may close the power supply 104 circuit in response to a connection event between the multiple elements 602(1)-(P) that occurs as a result of a portion of a body (e.g., the user's wrist) of the user 102 being positioned between the multiple elements 602(1)-(P). In the embodiment of FIGS. 6A and 6B, the multiple elements 602(1)-(P) may be positioned on an inside surface 604 of the wearable electronic device 100 (in this case, the inside of a band of the electronic watch). FIG. 6B further illustrates how the multiple elements 602(1)-(P) may be circumferentially distributed in a substantially even distribution on the inside surface 604.

Upon the user 102 wearing the wearable electronic device 100, the multiple elements 602(1)-(P) may register a connection event in the form of an electrical connection being established between the multiple elements 602(1)-(P) using a portion of the user's body (e.g., the user's wrist) contacting the multiple elements 602(1)-(P) as an electrical conductor. Similar to the embodiment described in FIG. 2 with respect to the wearable electronic device 100 in the form of electronic glasses, the multiple elements 602(1)-(P) may include a skin-conductive material on the surface of the multiple elements 602(1)-(P) to form a skin-conductive contact or electrode. The user's wrist may thereby close an electrical circuit between the multiple elements 602(1)-(P) to establish a connection event that causes closure of the power supply 104 circuit. The skin-conductive material that may be included on the inside surfaces of the multiple elements 602(1)-(P) may be any suitable skin-conductive material, as mentioned above with reference to FIG. 2.

In some embodiments, a connection event that triggers closure of the power supply 104 circuit may be determined from other suitable sensing mechanisms, such as at least one capacitive sensor, resistive sensor, surface acoustic wave (SAW) sensor, or any suitable touch or proximity-based sensing mechanism disposed on the inside surface 604 of the wearable band in order to detect contact or proximity between the user's wrist and one or more of the multiple elements 602(1)-(P). In this scenario, closure of the power supply 104 circuit may be triggered upon detection of the user's wrist being positioned within the wearable band by identifying contact or proximity to one or more of the multiple elements 602(1)-(P). In some embodiments, an electrical field of the user's body may be detected by one or more sensors of the ergonomic power switch 600 to determine a connection event.

FIG. 7 shows a side elevation view of the example wearable electronic device 100 of FIG. 6A including an example ergonomic power switch 700 according to another embodiment. In FIG. 7, the ergonomic power switch 700 may include multiple elements 702 and 704 that include a transmitter 706 and a receiver 708 of an optical beam 710, such as an infrared beam, similar to the optical beam 310 discussed with reference to FIG. 3. As discussed above, one of the elements 702 or 704 may include both the transmitter 706 and the receiver 708 wherein the optical beam 710 is reflected by a reflector included in the other of the elements 702 or 704 to reflect the optical beam 710 back to the receiver 708. In either scenario, a connection event that triggers closure of the power supply 104 circuit may occur upon the portion of the user's body (e.g., his/her wrist) being positioned between the multiple elements 702 and 704 such that the optical beam 710 is broken from the standpoint of the receiver 708. This type of connection event would be a "disconnection" event because the optical connection between the multiple elements 702 and 704 is disconnected upon the user 102 wearing the wearable electronic device 100.

FIG. 8 shows a side elevation view of the example wearable electronic device 100 of FIG. 6A including an example ergonomic power switch 800 according to another embodiment. The ergonomic power switch 800 may be configured to contact a portion of the user's body (e.g., the user's wrist) while the user 102 wears the wearable electronic device 100. Accordingly, the ergonomic power switch 800 may include a movable arm 802 or member positioned on an inside surface of the band, such as the inside surface 604 shown in FIG. 6. The movable arm 802 may form part of a leaf switch that is configured, upon the user 102 wearing the wearable electronic device 100, to switch the wearable electronic device 100 from a power off state to a power on state via closure of the power supply 104 circuit. That is, a portion of the user's body (e.g., his/her wrist) may exert a force in a direction of the arrow 804 upon the ergonomic power switch 800 to move the movable arm 802 from a first position toward the center of the band to a second position closer to the band.

It is to be appreciated that the ergonomic power switches 600, 700, and 800 may be implemented in a similar manner on any substantially "ring-shaped" wearable electronic device 100, such as any type of electronic wristband, electronic ring, electronic anklet, and the like. In the different scenarios, the user 102 may position different parts of his/her body between the multiple elements of the ergonomic power switches 600, 700, 800 (e.g., a finger, an ankle, his/her neck, etc.), and the implementation may only vary by size according to the particular wearable electronic device 100.

Moreover, it is to be appreciated that the specific dimensions, proportions, shapes and configurations of the ergonomic power switches described with reference to FIGS. 2-8 are not specific to the present invention. For example, the multiple elements 208, 210, 302, 304, 402, 404 of the ergonomic power switches for the electronic glasses of FIGS. 2-5 may be of various sizes (length, width, thickness), and shapes (e.g., rectangular, elliptical, etc.) without changing the basic characteristics of the ergonomic power switch. As another example, the multiple elements 602, 702, 704, as well as the movable arm 802 may be of various sizes, shapes and configurations without changing the basic characteristics of the ergonomic power switch.

Figure 9:
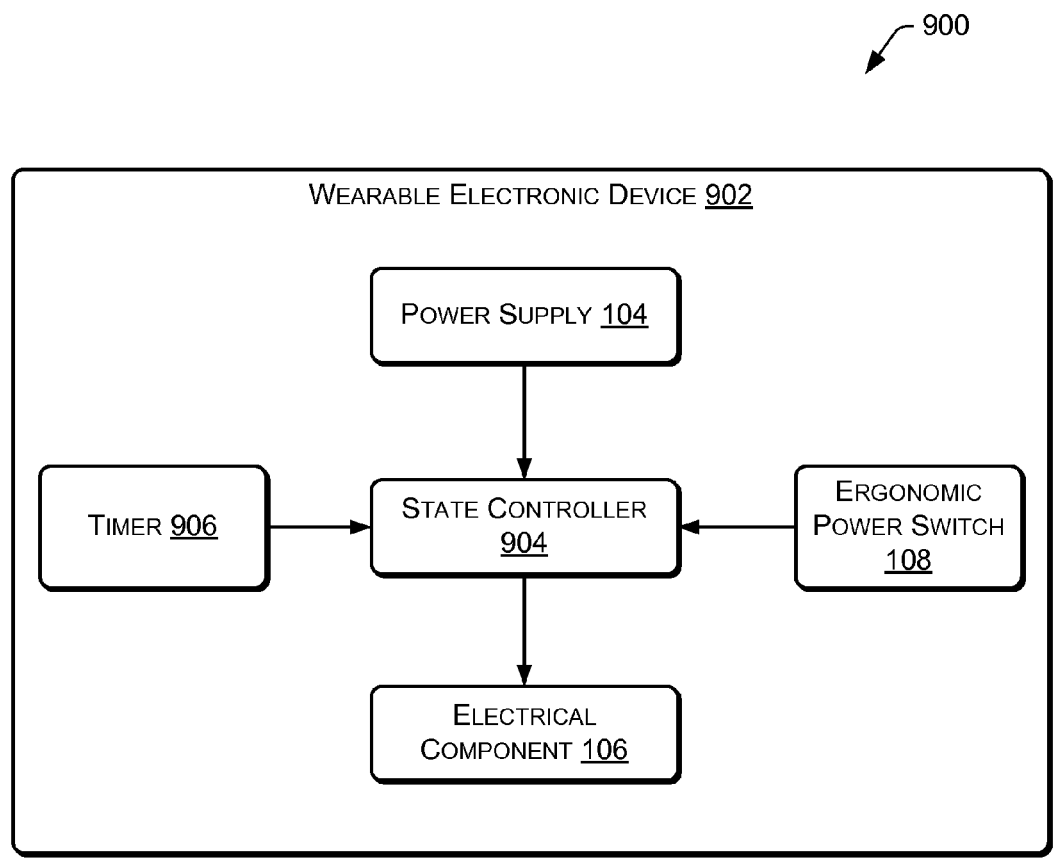
FIG. 9 illustrates an example block diagram of an example wearable electronic device including a state controller according to another embodiment.

FIG. 9 illustrates an example block diagram 900 of an example wearable electronic device 902 according to at least some embodiments. In the embodiment of FIG. 9, the wearable electronic device 902 may include a power supply 104, an electrical component 106, and an ergonomic power switch 108, which may be the same or similar to the power supply 104, the electrical component 106, and the ergonomic power switch 108 of FIG. 1. The wearable electronic device 902 may further comprise a state controller 904 or power manager that manages placement of the wearable electronic device 902 into various different power states ranging from a power off state to a power on state under full power. For example, various intermediate power states, such as power down some or all components of the wearable electronic device 902, but continue running one or more processors of the wearable electronic device 902, and/or a sleep/hibernate power state of relatively low power, etc.). In some implementations, the wearable electronic device 900 may comprise computer-executable instructions that, when executed, cause one or more processors (e.g., the state controller 904) to perform acts described herein In some embodiments, transitioning between power states, which in some embodiments may comprise transitioning from a full power on state to a full power off state, may be triggered upon expiration of a predefined time period. Accordingly, the wearable electronic device 902 may further include a timer 906 configured to initiate a clock or counter to keep track of time periods from state change events. These state change events may be themselves triggered by occurrence of the connection event described above, or a cessation of the connection event. That is, the wearable electronic device 902 may be configured to remain in the power on state while the connection event is maintained (i.e., while the user 102 continues to wear the wearable electronic device 100), while the ergonomic power switch 108 may switch the wearable electronic device 902 from the power on state to a different power state in response to cessation of the connection event. When such a "cessation" condition is detected, the timer 906 may be initiated to start a timeout period, the expiration of which (i.e., reaching a threshold time) will trigger a state change to another power level controlled by the state controller 904. Likewise, when the connection event subsequently occurs, this causes the wearable electronic device 902 to return to the power on state whereby the timer 906 may be reset.

Illustrative Processes

The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

Figure 10:
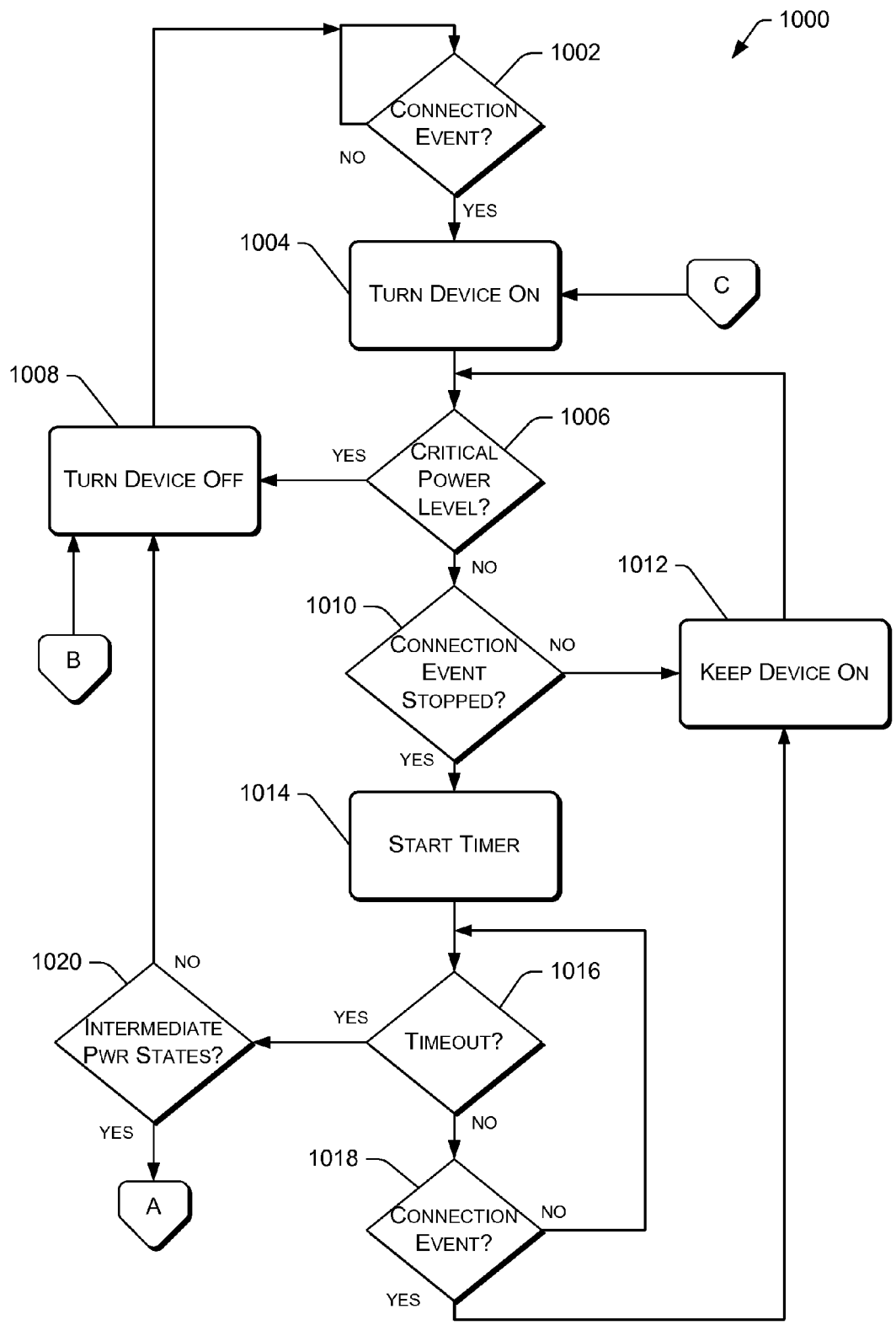
FIG. 10 is an illustrative process of controlling power supply to circuitry of a wearable electronic device using a timeout period.

FIG. 10 is an illustrative process 1000 of controlling power supply to circuitry of the wearable electronic device 100, 900 using a timeout period. The process 1000 may be implemented by one or more components of the wearable electronic device 100, 900, and in particular, the power supply 104, the state controller 904, and the timer 906.

At 1002, the state controller 904 may determine if a connection event has occurred to cause closure of the power supply 104 circuit by the ergonomic power switch 108 (i.e., whether the switch is on). Any suitable connection event, as described above, may be monitored at 1002. Moreover, it is contemplated that any suitable mechanical actuation of one or more elements, as described above, may amount to a connection event for purposes of FIGS. 10 and 11 where the system monitors for any suitable event that triggers the ergonomic power switch 108. If no connection event is detected, the process returns to 1002 by continually monitoring for a connection event. Once it is determined at 1002 that a connection event has occurred, the wearable electronic device 100, 900, or components thereof, may be turned on by supplying power from the power supply 104 to the electrical component 106 by closure of the circuit by the ergonomic power switch 108.

At 1006, the state controller 904 may monitor whether the power supply 104 is at a critical power level, such as below a threshold power level. For example, if a battery pack has less than a threshold amount of time remaining before it runs out of power, such a power level may be deemed a critical power level at 1006. If there is a critical power level at 1006, the state controller 904 may place the wearable electronic device 100, 900 into a power off state to turn the wearable electronic device 100, 900 off. At this point, the process 1000 may return to the initial step 1002 of monitoring the ergonomic power switch 108, such as after the power supply 104 has been recharged.

If the power supply 104 is not at a critical power level at 1006, the process 1000 may proceed to 1010 where it is determined if there has been a cessation of the connection event. If the connection event is maintained, the wearable electronic device 100 may be kept or maintained in a power on state at 1012.

If it is determined at 1010 that the connection event has stopped, the timer 906 may be started at 1014. At 1016, the state controller 904 may determine whether a timeout period has been reached (i.e., whether a predefined time period has expired). For example, a predefined time period may be set at one or two minutes. While waiting for the timeout period to expire, the state controller 904 may monitor for a connection event at 1018. For example, the user 102 may temporarily remove the wearable electronic device 100, 900 from his/her body, and then return to wearing the wearable electronic device 100, 900 before the timeout period expires at 1016. In that scenario, the device may be kept in a power on state at 1012 so as to avoid powering the device down when the user 102 temporarily stops wearing the wearable electronic device 100, 900.

If a connection event does not occur at 1018, the state controller 904 continues to monitor the timeout period until it is reached at 1016. Once the timeout period expires, it is determined at 1020 whether the device is to be placed into other lower power states before being turned off. If not, the wearable electronic device 100, 900 may be turned off (i.e., powered down) at 1008. In some embodiments, instead of turning the wearable electronic device 100, 900 off after the timeout period, the user 102 may be logged off of the wearable electronic device 100, 900 so that the user 102 may be asked to authenticate or login upon the occurrence of a subsequent connection event.

Figure 11:
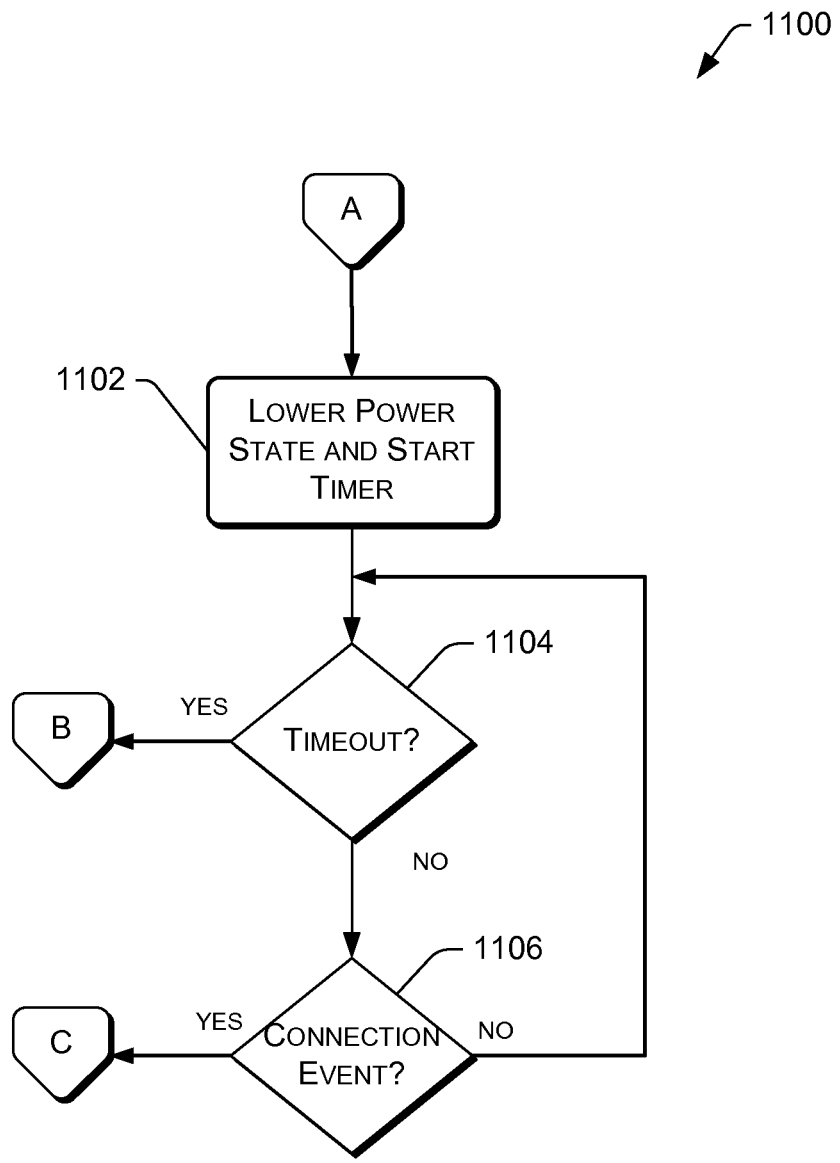
FIG. 11 is an illustrative process of controlling power states of an example wearable electronic device.

If the wearable electronic device 100, 900 is to be placed in a lower power state before being turned off, the process 1000 may proceed to another power management process continuing on FIG. 11, which is illustrated by the arrow going to the "A" designator in FIG. 10, which continues in FIG. 11.

FIG. 11 is an illustrative process 1100 of controlling power states of an example wearable electronic device 100, 900. The process 110 may continue from the process 1000 of FIG. 10 as shown by the "A" designator in FIG. 11.

At 1102, after the timeout period (e.g., 60 seconds) has expired, the state controller 904 may place the wearable electronic device 100, 900 into a lower power state and start the timer 906. The lower power state may be a power state where certain components of the wearable electronic device 100, 900 are powered off, but one or more processors continue to run, or it may be a sleep/hibernate power state.

At 1104, the state controller 904 determines whether another timeout period has expired. The timeout period at 1104 may be the same or different than the timeout period at 1016 of FIG. 10. For example, the timeout period at 1104 may be five minutes. Until the timeout period expires, the state controller 904 may determine whether a connection event has occurred at 1106. If a connection event has not occurred, the process 1100 continues to monitor the timeout period 1104 and connection event occurrence at 1106. If the state controller 904 determines that a connection event has occurred at 1106, the process may proceed to the letter designation "C" which leads to the turn device on step 1004 of FIG. 10 where power may be supplied to the electrical component 106 to power the wearable electronic device 100, 900 on.

On the other hand, if the timeout period expires at 1104 without a connection event, the state controller 904 may place the wearable electronic device 100, 900 into a power off state by proceeding to the "B" designator that leads to the turn device off action at 1008 of FIG. 10. The process 1100 may be iterated for any number of intermediate power states.

Although the present invention has been described in relation to particular embodiments thereof, many other variations and modifications and other uses will become apparent to those skilled in the art. Therefore, the present invention should be limited not by the specific disclosure herein, but only by the appended claims.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. Electronic glasses comprising:
   a circuit including a power supply, the circuit further including:
   an ergonomic power switch to selectively close the circuit, the ergonomic power switch comprising a nose piece that is configured to cause closure of the circuit in response to a nose of a user being positioned within the nose piece.

2. The electronic glasses of claim 1, wherein the nose piece includes a pair of skin-conductive contacts, and wherein the nose of the user contacting the pair of skin-conductive contacts causes the closure of the circuit.

3. The electronic glasses of claim 1, wherein the nose piece includes one or more capacitive sensors, and wherein the nose of the user contacting the one or more capacitive sensors causes the closure of the circuit.

4. The electronic glasses of claim 1, wherein the nose piece includes a transmitter and a receiver of an optical beam, and wherein the nose of the user blocking receipt by the receiver of the optical beam causes the closure of the circuit.

5. The electronic glasses of claim 1, wherein the nose piece comprises a pair of nose pads, and wherein at least one nose pad of the pair of nose pads includes a mechanical switching mechanism, and wherein the nose of the user exerting a reaction force upon the at least one nose pad causes the closure of the circuit.

6. A wearable electronic device comprising:
   a circuit including a power supply, the circuit further including:
   an ergonomic power switch to selectively close the circuit, the ergonomic power switch comprising multiple elements that are configured to cause closure of the circuit in response to a connection event, the connection event occurring in response to receipt of a portion of a body of a user between the multiple elements.

7. The wearable electronic device of claim 6, wherein the wearable electronic device comprises electronic glasses, and wherein the multiple elements of the ergonomic power switch are included in a nose piece on the electronic glasses.

8. The wearable electronic device of claim 7, wherein the connection event is a first connection event, and wherein the multiple elements of the ergonomic power switch further comprise a pair of temple pads configured to detect a second connection event when another portion of the body of the user is positioned between the pair of temple pads, and wherein the first connection event or the second connection event causes the closure of the circuit.

9. The wearable electronic device of claim 6, wherein the multiple elements include one or more conductive contacts, and wherein the connection event occurs in response to the portion of the body of the user contacting the one or more conductive contacts.

10. The wearable electronic device of claim 6, wherein the multiple elements include a transmitter and a receiver of an optical beam, and wherein the connection event comprises a break in the optical beam caused by the portion of the body of the user being positioned such that receipt of the optical beam by the receiver is blocked.

11. The wearable electronic device of claim 10, wherein the optical beam comprises an infrared beam.

12. The wearable electronic device of claim 6, wherein the wearable electronic device comprises an electronic wearable band, and wherein the multiple elements of the ergonomic power switch are positioned on an inside surface of the electronic wearable band.

13. The wearable electronic device of claim 12, wherein the multiple elements are circumferentially distributed in a substantially even manner on the inside surface of the electronic wearable band.

14. The wearable electronic device of claim 13, wherein the multiple elements comprise three or more skin-conductive contacts, and wherein the connection event occurs in response to the portion of the body of the user contacting at least two of the three or more skin-conductive contacts.

15. The wearable electronic device of claim 13, wherein the multiple elements comprise at least one transmitter and at least one receiver of at least one optical beam projected as a chord across the inside surface of the electronic wearable band, and wherein the connection event comprises a break in the optical beam caused by the portion of the body of the user being positioned such that receipt of the optical beam by the receiver is blocked.

16. The wearable electronic device of claim 6, wherein the ergonomic power switch is configured to maintain the closure of the circuit while the connection event is maintained, and wherein the ergonomic power switch is configured to cause opening of the circuit in response to cessation of the connection event.

17. The wearable electronic device of claim 6, further comprising a timer that is configured to be initiated upon a cessation of the connection event, and wherein the ergonomic power switch is configured to cause opening of the circuit upon the timer reaching a threshold, and wherein the timer is configured to be reset upon a subsequent connection event occurring before the timer reaches the threshold.

18. The wearable computer of claim 6, further comprising a timer that is configured to be initiated upon a cessation of the connection event, and wherein the ergonomic power switch is further configured to switch the wearable electronic device from a power on state to a low power state upon the timer reaching a threshold.

19. A wearable electronic device comprising:
a circuit comprising:
a power supply;
an electrical component selectively coupled to the power supply by an ergonomic power switch; and
the ergonomic power switch comprising an element configured to detect a force exerted upon the element by a portion of a body of a user when the wearable electronic device is worn by the user, the element configured to cause closure of the circuit when the force is detected.

20. The wearable electronic device of claim 19, wherein the wearable electronic device comprises an electronic wearable band, and wherein the element comprises a movable device positioned on an inside surface of the electronic wearable band, the movable device being biased toward a first position and movable to a second position in response to the force to cause the closure of the circuit upon the movable device being in the second position.

21. The wearable electronic device of claim 19, wherein the wearable electronic device comprises electronic glasses, and wherein the element comprises a nose piece of the electronic glasses.

* * * * *